United States Patent
Kang et al.

(10) Patent No.: US 11,792,737 B2
(45) Date of Patent: *Oct. 17, 2023

(54) METHOD AND APPARATUS FOR CONTROLLING UPLINK TRANSMISSION POWER IN WIRELESS COMMUNICATION SYSTEM

(71) Applicant: Samsung Electronics Co., Ltd., Gyeonggi-do (KR)

(72) Inventors: Jinkyu Kang, Gyeonggi-do (KR); Youngbum Kim, Gyeonggi-do (KR); Taehyoung Kim, Gyeonggi-do (KR); Taehan Bae, Gyeonggi-do (KR); Jeongho Yeo, Gyeonggi-do (KR); Jinyoung Oh, Gyeonggi-do (KR); Seunghoon Choi, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/553,054

(22) Filed: Dec. 16, 2021

(65) Prior Publication Data

US 2022/0110065 A1    Apr. 7, 2022

Related U.S. Application Data

(63) Continuation of application No. 16/889,172, filed on Jun. 1, 2020, now Pat. No. 11,228,983, which is a
(Continued)

(30) Foreign Application Priority Data

Jan. 8, 2018    (KR) .................. 10-2018-0002252

(51) Int. Cl.
*H04W 52/14*    (2009.01)
*H04W 52/24*    (2009.01)
(Continued)

(52) U.S. Cl.
CPC ......... *H04W 52/146* (2013.01); *H04L 5/0048* (2013.01); *H04W 52/08* (2013.01); *H04W 52/245* (2013.01); *H04W 52/42* (2013.01)

(58) Field of Classification Search
CPC ..... H04L 5/001; H04L 5/0048; H04L 5/0092; H04W 52/08; H04W 52/146; H04W 52/245; H04W 52/42
(Continued)

(56) References Cited

U.S. PATENT DOCUMENTS 9,014,031 B2 * 4/2015 Suzuki ............. H04W 72/0473
370/252
9,191,899 B2 11/2015 Kim et al.
(Continued)

FOREIGN PATENT DOCUMENTS

CN    103765966    4/2014
CN    107211446    9/2017
(Continued)

OTHER PUBLICATIONS

KR Notice of Allowance dated Mar. 24, 2022 issued in counterpart application No. 10-2018-0002252, 3 pages.
(Continued)

*Primary Examiner* — Tan H Trinh
(74) *Attorney, Agent, or Firm* — The Farrell Law Firm, P.C.

(57) ABSTRACT

A method, performed by a terminal, of transmitting and receiving a signal in a wireless communication system is provided. The method includes receiving a first reference signal (RS) on a first downlink bandwidth part (BWP) of a first carrier of a serving cell; determining first pathloss information for a transmission of a physical uplink control channel (PUCCH) based on the first RS received on the first downlink BWP of the first carrier of the serving cell;
(Continued)

determining a transmission power for the PUCCH based on the first pathloss information; receiving a second RS on a second downlink BWP of a second carrier of the serving cell; determining second pathloss information for a transmission of a physical uplink shared channel (PUSCH) based on the second RS received on the second downlink BWP of the second carrier of the serving cell; and determining a transmission power for the PUSCH based on the second pathloss information.

20 Claims, 13 Drawing Sheets

Related U.S. Application Data continuation of application No. 16/242,651, filed on Jan. 8, 2019, now Pat. No. 10,681,645.

(51) Int. Cl.
    *H04L 5/00*           (2006.01)
    *H04W 52/42*        (2009.01)
    *H04W 52/08*        (2009.01)

(58) Field of Classification Search
    USPC .................................... 455/69, 522; 370/252
    See application file for complete search history.

(56) References Cited

U.S. PATENT DOCUMENTS

| | | | |
|---|---|---|---|
| 9,839,016 | B2 | 12/2017 | Ouchi et al. |
| 10,681,645 | B2* | 6/2020 | Kang ............... H04W 52/42 |
| 11,228,983 | B2* | 1/2022 | Kang ............... H04L 5/0092 |
| 2014/0087782 | A1* | 3/2014 | Zhang ............ H04W 52/242 |
| | | | 455/522 |
| 2015/0063259 | A1 | 3/2015 | Gohari |
| 2016/0159261 | A1 | 6/2016 | Lamber |
| 2017/0063479 | A1 | 3/2017 | Kim |
| 2017/0339591 | A1 | 11/2017 | Li |
| 2017/0339660 | A1 | 11/2017 | Kazmi |
| 2017/0373741 | A1 | 12/2017 | Yang |
| 2018/0049047 | A1 | 2/2018 | Lin |
| 2018/0167170 | A1 | 6/2018 | Kim |
| 2018/0213386 | A1 | 7/2018 | Kim |
| 2018/0270713 | A1 | 9/2018 | Park |
| 2018/0270791 | A1 | 9/2018 | Park |
| 2018/0270792 | A1 | 9/2018 | Park |
| 2018/0270894 | A1 | 9/2018 | Park |
| 2018/0302195 | A1 | 10/2018 | Kim |
| 2018/0302203 | A1 | 10/2018 | Kim |
| 2019/0007923 | A1 | 1/2019 | Blankenship |
| 2019/0132857 | A1 | 5/2019 | Babaci |
| 2019/0141742 | A1 | 5/2019 | Zhou |
| 2019/0149380 | A1 | 5/2019 | Babaei |
| 2019/0150183 | A1 | 5/2019 | Aiba |
| 2019/0158205 | A1 | 5/2019 | Sheng |
| 2019/0174466 | A1 | 6/2019 | Zhang |
| 2019/0208436 | A1 | 7/2019 | Zhou |
| 2019/0222354 | A1 | 7/2019 | Han |
| 2019/0230685 | A1 | 7/2019 | Park |
| 2019/0254110 | A1 | 8/2019 | He |
| 2019/0260447 | A1 | 8/2019 | Nam |
| 2019/0268883 | A1 | 8/2019 | Zhang |
| 2020/0037260 | A1 | 1/2020 | Fu |
| 2020/0107341 | A1* | 4/2020 | Zhang ................. H04L 5/001 |
| 2020/0196383 | A1 | 6/2020 | Tsai |
| 2020/0213161 | A1 | 7/2020 | Zhang |
| 2020/0280357 | A1* | 9/2020 | Bae ................. H04L 5/0098 |
| 2020/0296674 | A1 | 9/2020 | Kang |
| 2022/0312317 | A1 | 9/2022 | Kim et al. |

FOREIGN PATENT DOCUMENTS

| | | |
|---|---|---|
| EP | 2 747 494 | 6/2014 |
| EP | 1 745 571 | 2/2017 |
| WO | WO 2011/099324 | 8/2011 |

OTHER PUBLICATIONS

Indian Examination Report dated May 5, 2022 issued in counterpart application No. 202037029680, 6 pages.
3GPP, 3rd Generation Partnership Project; Technical Specification Group Radio Access Network; NR; Medium Access Control (MAC) Protocol Specification, (Release 15), 3GPP TS 38.321 V15.0.0, Jan. 4, 2018, 55 pages.
3GPP, 3rd Generation Partnership Project; Technical Specification Group Radio Access Network; NR; Radio Resource Control (RRC) Protocol Specification, (Release 15), 3GPP TS 38.331 V15.0.0, Jan. 4, 2018, 188 pages.
International Search Report dated Mar. 25, 2019 issued in counterpart application No. PCT/KR2019/000253, 11 pages.
Ericsson, "Verification of Pcmax and UL Power Control for mmW", R4-1707794, TSG-RAN Working Group 4 (Radio) Meeting ∩84, Aug. 21-25, 2017, 4 pages.
LG Electronics, "Discussion on UL Power Control for NR CA Case", R1-1719945, 3GPP TSG RAN WG1 Meeting 91, Nov. 27-Dec. 1, 2017, 8 pages.
ZTE, Sanechips, "Offline Summary of UL Power Control—Non-CA Aspects", R1-1721676, 3GPP TSG RAN WG1 Meeting ∩91, Nov. 27-Dec. 1, 2017, 65 pages.
European Search Report dated Dec. 23, 2020 issued in counterpart application No. 19736118.1-1212, 10 pages.
Korean Office Action dated Jul. 23, 2021 issued in counterpart application No. 10-2018-0002252, 7 pages.
3GPP, 3rd Generation Partnership Project; Technical Specification Group Radio Access Network; NR; Physical Layer Procedures for Control (Release 15), 3GPP TS 38.213 V15.0.0, Jan. 3, 2018, 56 pages.
Australian Examination Report dated Sep. 12, 2022 issued in counterpart application No. 2019205733, 4 pages.
European Search Report dated Dec. 16, 2022 issued in counterpart application No. 19736118.1-1216, 6 pages.
Korean Office Action dated Apr. 3, 2023 issued in counterpart application No. 10-2022-0077810, 11 pages.
Chinese Office Action dated Jul. 10, 2023 issued in counterpart application No. 201980007654.8, 12 pages.

* cited by examiner

METHOD AND APPARATUS FOR CONTROLLING UPLINK TRANSMISSION POWER IN WIRELESS COMMUNICATION SYSTEM

CROSS-REFERENCE TO RELATED APPLICATION(S)

This application is a Continuation Application of U.S. patent application Ser. No. 16/889,172, which was filed in the U.S. Patent and Trademark Office (USPTO) on Jun. 1, 2020, which is a Continuation Application of U.S. patent application Ser. No. 16/242,651, which was filed in the USPTO on Jan. 8, 2019, issued as U.S. Pat. No. 10,681,645 on Jun. 9, 2020, and claims priority under 35 U.S.C. § 119 to Korean Patent Application Serial No. 10-2018-0002252, filed on Jan. 8, 2018, in the Korean Intellectual Property Office, the entire disclosure of each of which is incorporated herein by reference.

BACKGROUND

1. Field

The disclosure relates generally to wireless communication systems, and more particularly, to a method and apparatus for controlling uplink transmission power of a terminal in a wireless communication system.

2. Description of Related Art

To meet the demand for ever-increasing wireless data traffic since commercialization of the $4^{th}$-generation (4G) communication system, there have been efforts to develop an advanced 5th generation (5G) system or pre-5G communication system. For this reason, the 5G or pre-5G communication system is also called a beyond 4G network communication system or post long term evolution (LTE) system. Implementation of the 5G communication system using ultra-frequency (mmWave) bands (e.g., 60 GHz bands) is considered to attain higher data rates. To reduce propagation loss of radio waves and increase a transmission range in the ultra-frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation, and the like are also being developed in the 5G communication system. In addition, in the 5G system, an advanced coding modulation (ACM) (e.g., hybrid FSK and QAM modulation (FQAM)), sliding window superposition coding (SWSC), and advanced access technology (e.g., filter bank multi carrier (FBMC)), non-orthogonal multiple access (NOMA), sparse code multiple access (SCMA) are being developed.

In the meantime, the Internet is evolving into an Internet of things (IoT) network where distributed entities such as things send, receive and process information without human intervention. The Internet of everything (IoE) technologies combined with IoT, such as big data processing technologies through connection with a cloud server, for example, have also emerged. To implement IoT, various technologies, such as sensing technology, wired/wireless communication and network infrastructure, service interfacing technology, and security technology are required, and recently, even technologies for sensor network, machine to machine (M2M), and machine type communication (MTC) for connection between things are being studied. Such an IoT environment may provide intelligent internet technology (IT) services that create a new value to human life by collecting and analyzing data generated among connected things.

IoT may be applied to a variety of areas, such as a smart home, a smart building, a smart city, a smart car or connected car, a smart grid, health care, smart home appliances and advanced medical services through convergence and combination between existing IT and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, and array antenna schemes, etc. Even the application of a cloud RAN as the aforementioned big data processing technology may be an example of convergence of 5G and IoT technologies.

With the development of the aforementioned technologies and wireless communication systems, it is possible to provide various services, and there is a need for a method to provide the services smoothly.

SUMMARY

The present disclosure has been made to address at least the disadvantages described above and to provide at least the advantages described below.

In accordance with an aspect of the present disclosure, a method, performed by a terminal, in a wireless communication system is provided. The method includes receiving a first reference signal (RS) on a first downlink bandwidth part (BWP) of a first carrier of a serving cell; determining first pathless information for a transmission of a physical uplink control channel (PUCCH) based on the first RS received on the first downlink BWP of the first carrier of the serving cell; determining a transmission power for the PUCCH based on the first pathless information; receiving a second RS on a second downlink BWP of a second carrier of the serving cell; determining second pathless information for a transmission of a physical uplink shared channel (PUSCH) based on the second RS received on the second downlink BWP of the second carrier of the serving cell; and determining a transmission power for the PUSCH based on the second pathless information.

In accordance with an aspect of the present disclosure, a method, performed by a serving base station in a wireless communication system is provided. The method includes transmitting a first reference signal (RS) on a first downlink bandwidth part (BWP) of a first carrier of a serving cell; transmitting a second RS on a second downlink BWP of a second carrier of the serving cell; receiving, from a terminal, a physical uplink control channel (PUCCH) based on a PUCCH transmission power determined using the first RS; and receiving, from the terminal, a physical uplink shared channel (PUSCH) based on a PUSCH transmission power determined using the second RS, wherein the PUCCH transmission power is determined based on first pathless information for the PUCCH and the first pathless information for the PUCCH is determined based on the first RS; and wherein the PUSCH transmission power is determined based on second pathless information for the PUCCH and the second pathloss information for the PUCCH is determined based on the second RS.

In accordance with an aspect of the present disclosure, a terminal is provided for use in a wireless communication system. The terminal includes a transceiver; and at least one processor coupled with the transceiver and configured to receive a first reference signal (RS) on a first downlink bandwidth part (BWP) of a first carrier of a serving cell, determine first pathloss information for a transmission of a physical uplink control channel (PUCCH) based on the first RS received on the first downlink BWP of the first carrier of the serving cell, determine a transmission power for the PUCCH based on the first pathloss information, receive a second RS on a second downlink BWP of a second carrier of the serving cell, determine second pathloss information for a transmission of a physical uplink shared channel (PUSCH) based on the second RS received on the second downlink BWP of the second carrier of the serving cell, and determine a transmission power for the PUSCH based on the second pathless information.

In accordance with an aspect of the present disclosure, a serving base station is provided for use in a wireless communication system. The serving base station includes a transceiver; and at least one processor coupled with the transceiver and configured to transmit a first reference signal (RS) on a first downlink bandwidth part (BWP) of a first carrier of a serving cell, transmit a second RS on a second downlink BWP of a second carrier of the serving cell, receive, from a terminal, a physical uplink control channel (PUCCH) based on a PUCCH transmission power determined using the first RS, and receive, from the terminal, a physical uplink shared channel (PUSCH) based on a PUSCH transmission power determined using the second RS, wherein the PUCCH transmission power is determined based on first pathless information for the PUCCH and the first pathless information for the PUCCH is determined based on the first RS; and wherein the PUSCH transmission power is determined based on second pathloss information for the PUCCH and the second pathloss information for the PUCCH is determined based on the second RS.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
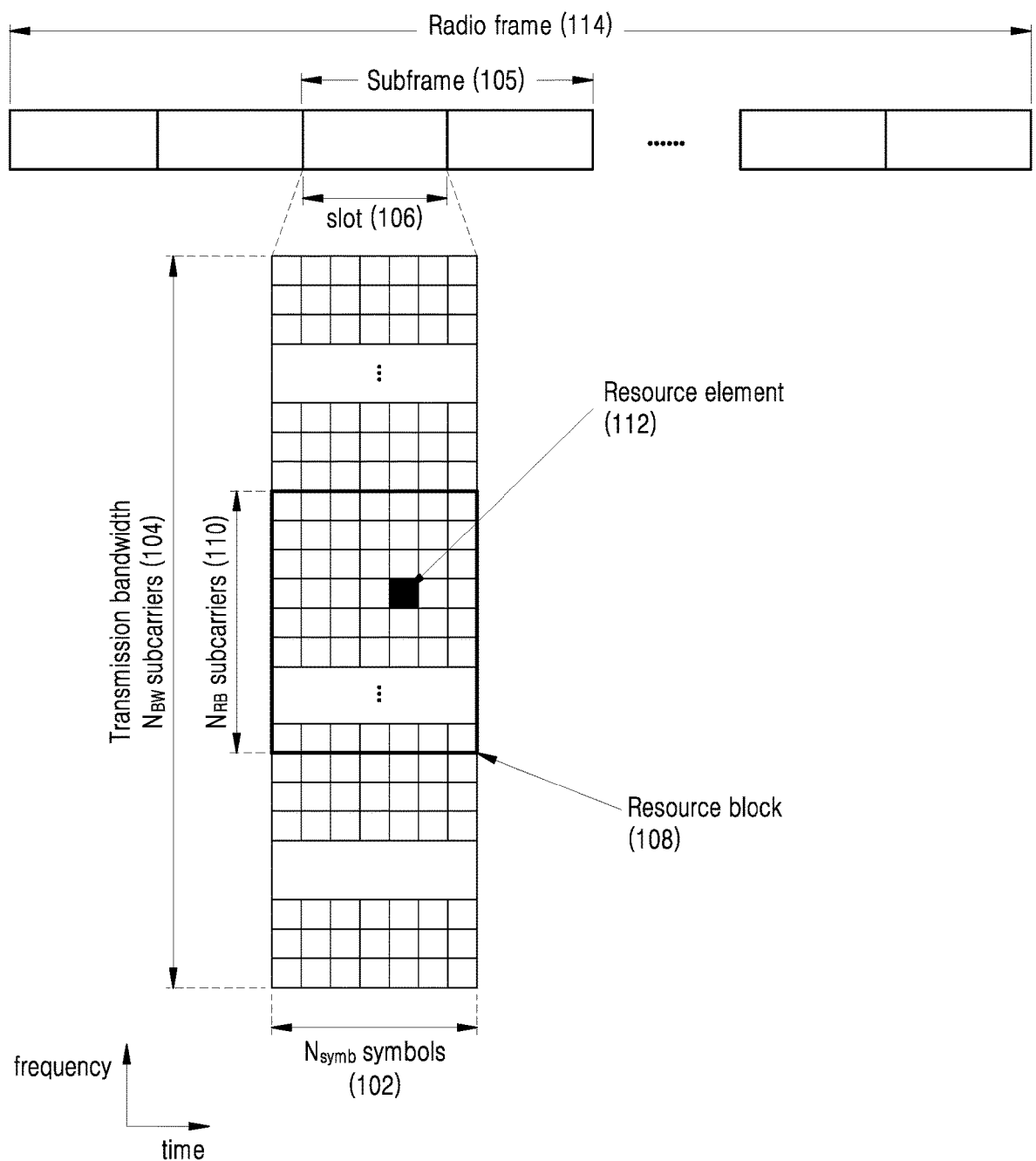
FIG. 1 is a diagram of a time-frequency resource domain, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™ Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

In the following description, a base station is an entity for performing resource allocation for a terminal, and may be at least one of Node B, BSs, eNode s (eNs), gNode B (gNB), radio access unit, base station controller, or network node. A terminal may include user equipment (UE), a mobile station (MS), a cellular phone, a smart phone, a computer, or a multimedia system capable of performing communication. Embodiments of the present disclosure will also be applied to other communication systems with similar technical backgrounds or channel types to the embodiments of the present disclosure. Furthermore, embodiments of the present disclosure will also be applied to other communication systems through some modifications to an extent that does not significantly deviate the scope of the present disclosure as determined by skilled people in the art.

To handle explosive mobile data traffic, the 5G system or new radio (NR) access technology, which is the next generation communication system after the long term evolution (LTE) or evolved universal terrestrial radio access (E-UTRA) and LTE-Advanced (LTE-A) or E-UTRA evolution is discussed actively these days. While the existing mobile communication system has focused on typical voice/data communication, the 5G system aims to meet various services and demands, such as enhanced mobile broadband (eMBB) services to improve the existing voice/data communication, ultra-reliable and low latency communication (URLLC) services, massive MTC services, etc.

The 5G system is mainly designed for data services of ultra high speed up to several Gbps using ultra wide bandwidth that is much wider than in the existing LTE and LTE-A system that has a maximum of 20 MHz of system transmission bandwidth for a single carrier. Accordingly, the 5G system considers the ultra high frequency band from several GHz to a maximum of 100 GHz, from which it is relatively easy to secure the ultra-wide bandwidth frequency as a candidate frequency band. In addition, it considers securing a wide bandwidth frequency for the 5G system through frequency relocation or allocation among the frequency band ranging from hundreds of MHz to several GHz used in the existing mobile communication system.

When a base station supports the wide bandwidth frequency, a bandwidth part (BWP) technique which divides the entire carrier frequency band into multiple frequency bands, each of which the base station may support for each terminal, is becoming more important. Specifically, in the case that the base station supports the BWP, when a terminal has low BW capability, the base station may support a small frequency bandwidth to the terminal through the BWP and reduce energy consumption of the terminal by reducing the frequency bandwidth through a change of BWP. Besides, it gives an advantage of providing a terminal with various services without latency by changing the BWP while providing a different frame structure for each BWP. The BWP technology may be applied to a control channel or data channel corresponding one to one between a certain terminal and the base station. It may also be applied even for a control channel and data channel, on which the base station transmits common signals (e.g., synchronization signal, physical broadcast channel (PBCH), and/or system information) to multiple terminals in the system, to help the base station save energy by transmitting the signals in an established BWP.

As another demand for the 5G system, ultra-low latency services are required whose transmission latency is 1 ms or so between transmitting and receiving ends. As a solution for reducing the transmission latency, there is a need to design a frame structure based on short transmission time interval (TTI) as compared with that of LTE and LTE-AA TTI is a basic time unit in performing scheduling, and the TTI for the existing LTE and LTE-A is 1 ms, which corresponds to the length of one subframe. For example, the short TTI to meet the requirement for the ultra-low latency service of the 5G system may be about 0.5 ms, 0.2 ms, 0.1 ms, etc., which is shorter than that of the existing LTE and LTE-A system. A frame structure of the LTE and LTE-A systems will now be described with reference to the accompanying drawings, and design guidelines for the 5G system will be described next.

FIG. 1 is a diagram of a time-frequency resource domain, which is a radio resource domain where data or a control channel is transmitted in LTE and LTE-A systems, according to an embodiment.

Referring to FIG. 1, the horizontal axis of the time-frequency resource domain indicates the time domain, and the vertical axis indicates the frequency domain. Throughout the specification, a radio link in which a terminal transmits data or a control signal to a base station is called uplink (UL) and a radio link in which a base station transmits data or a control signal to a terminal is called downlink (DL).

The smallest transmission unit in the time domain of the existing LTE and LTE-A systems is an orthogonal frequency division multiplexing (OFDM) symbol for DL and a single carrier-frequency division multiple access (SC-FDMA) symbol for UL. Nsymb symbols 102 may constitute one slot 106. Two slots may constitute one subframe 105. The slot is 0.5 ms long, and the subframe is 1.0 ms long. A radio frame 114 is a time domain unit including ten subframes. In the frequency domain, the smallest transmission unit is a 15 kHz unit of subcarrier (subcarrier spacing=15 kHz), and the bandwidth of the overall system transmission band may have a total of $N_{BW}$ subcarriers 104. The basic resource unit in the time-frequency domain is a resource element (RE) 112, which may be represented with at least one of OFDM symbol or SC-FDMA symbol index and subcarrier index. A resource block (RB) 108 or physical resource block (PRB) may be defined with consecutive Nsymb OFDM symbols 102 or SC-FDMA symbols in the time domain and consecutive $N_{RB}$ subcarriers 110 in the frequency domain. Accordingly, one RB 108 may include Nsymb×$N_{RB}$ REs (112). In the LTE and LTE-A systems, data is mapped in RB units, and the base station may perform scheduling in RB-pair units that constitute one subframe for a certain terminal. The number of SC-FDMA symbols or OFDM symbols, Nsymb, is defined by the length of cyclic prefix (CP) added to each symbol to avoid inter-symbol interference. For example, for the normal CP, Nsymb=7, and for the extended CP, Nsymb=6. The extended CP is used in a system with a relatively long radio transmission range than of the normal CP to maintain orthogonality between symbols.

Subcarrier spacing, CP length, etc., are essential information for OFDM transmission and reception, so that the base station and the terminal need to recognize them as common values to perform smooth transmission and reception.

$N_{BW}$ and $N_{RB}$ are proportional to the bandwidth of the system transmission band. Data rate increases in proportion to the number of RBs scheduled for the terminal.

The aforementioned frame structure of the LTE and LTE-A systems is designed for typical voice/data communication and has limitations on scalability to meet various services and requirements as in the 5G system. Accordingly, considering various services and requirements, the frame structure for the 5G system needs to be dynamically defined and operated.

Figure 2:
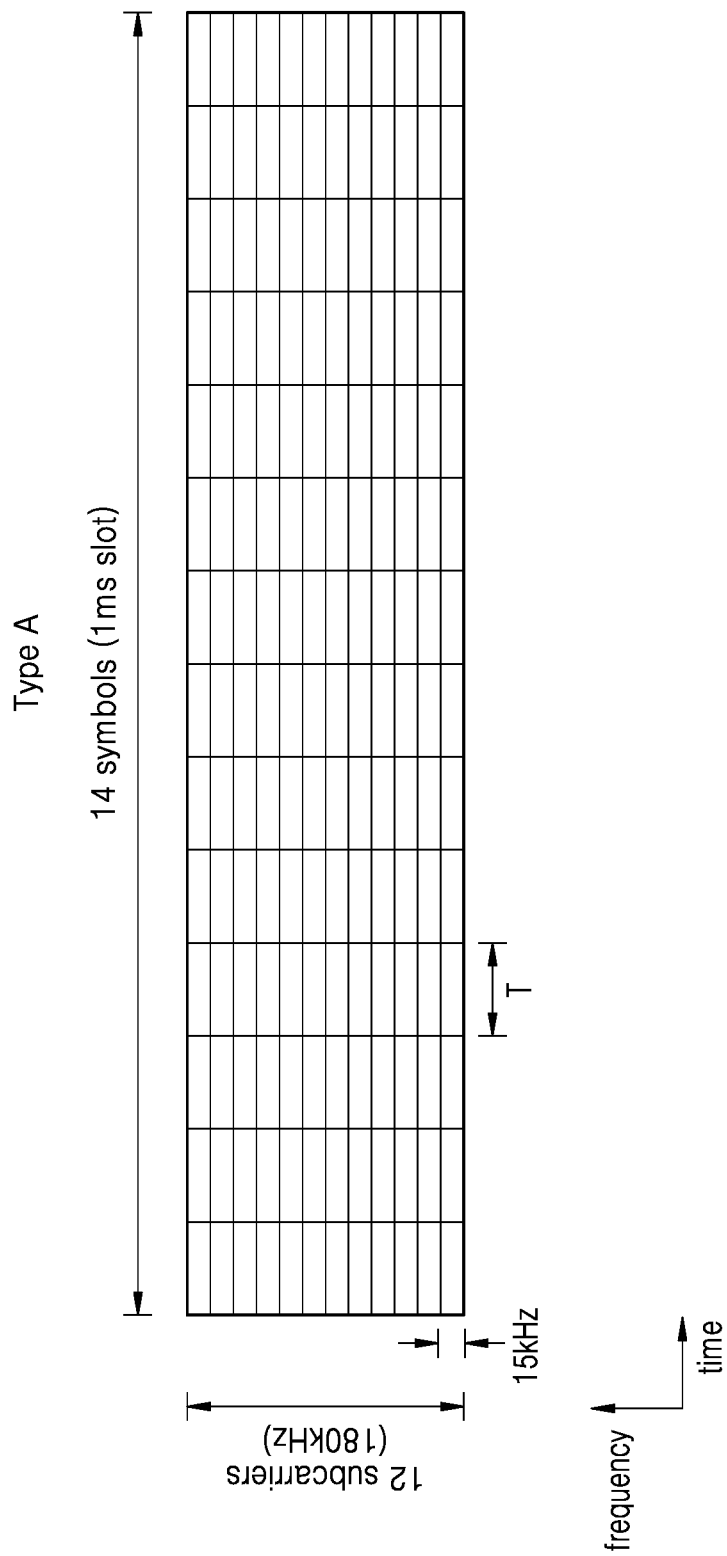
FIG. 2 is a diagram of a scalable frame structure for a 5G system, according to an embodiment.
Figure 3:
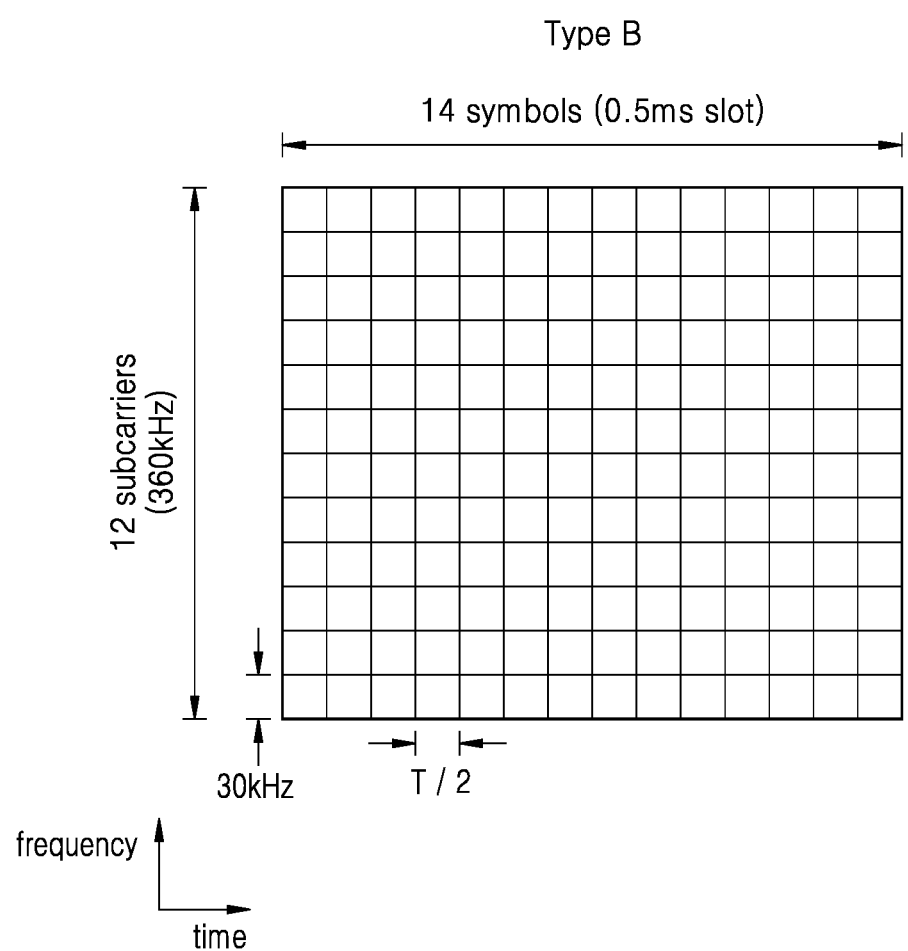
FIG. 3 is a diagram of a scalable frame structure for a 5G system, according to an embodiment.
Figure 4:
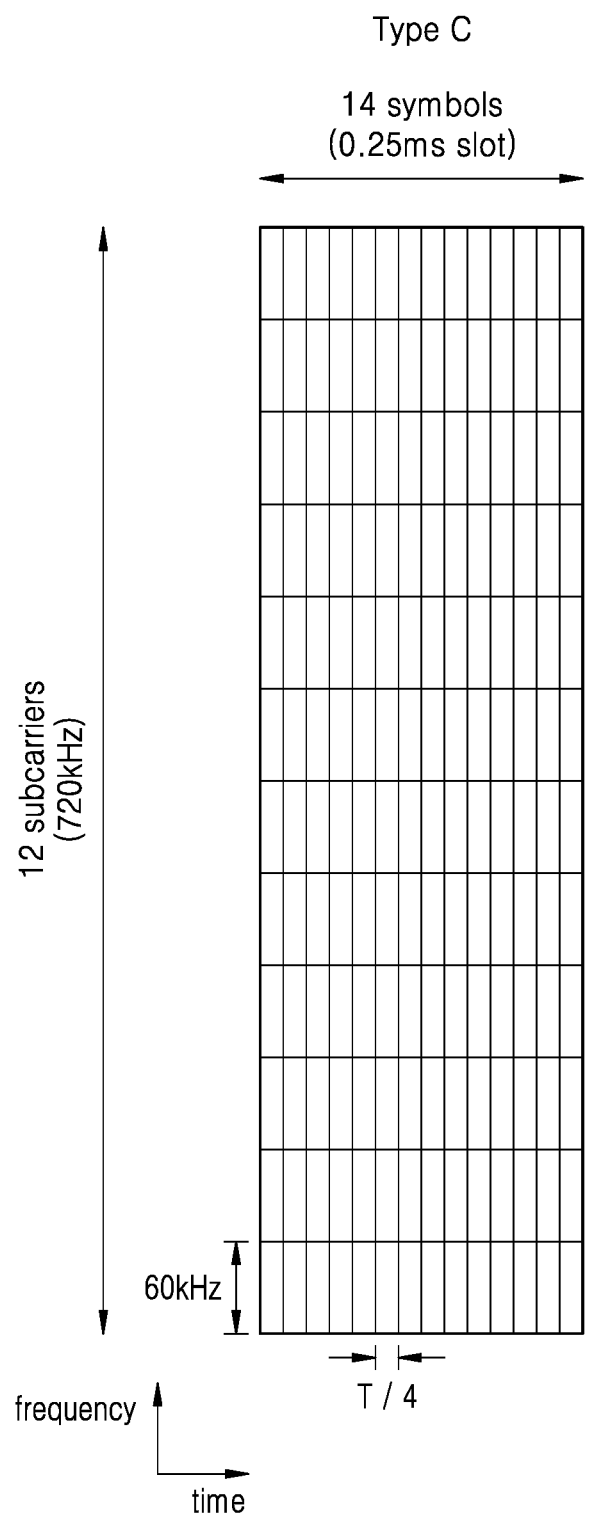
FIG. 4 is a diagram of a scalable frame structure for a 5G system, according to an embodiment.

FIGS. 2 to 4 are diagrams of scalable frame structures for the 5G system, according to an embodiment.

It is assumed that subcarrier spacing, CP length, and slot length are a set of required parameters to define a scalable frame structure in FIGS. 2 to 4, Although the basic time unit for scheduling in the 5G system is a slot, it is only by way of example and may be adjusted according to preferences.

In the early days of the introduction of the 5G system, the 5G system and the existing LTE/LTE-A system are expected to coexist or operate in dual mode. This allows the existing LTE/LTE-A systems to perform stable system operation and 5G systems to provide enhanced services. Accordingly, the scalable frame structure for the 5G system needs to include at least the frame structure or required parameter set for the LTE/LTE-A.

In FIG. 2, the frame structure or required parameter set of the 5G system, which is the same as those of the LTE/LTE-A, is shown. Referring to FIG. 2, subcarrier spacing in a type A frame structure may be 15 kHz, 14 symbols may constitute a 1 ms slot, and 12 subcarriers, 12×15 kHz=180 kHz, may constitute a PRB.

FIG. 3 shows a type B frame structure. Referring to FIG. 3, subcarrier spacing in the type B frame structure may be 30 kHz, 14 symbols may constitute a 0.5 ms slot, and 12 subcarriers, 12×30 kHz=360 kHz, may constitute a PRB. The type B frame structure is two times larger in the subcarrier spacing and the PRB size and two times smaller in the slot length and the symbol length than the type A frame structure.

FIG. 4 shows a type C frame structure. Referring to FIG. 4, subcarrier spacing in the type C frame structure may be 60 kHz, 14 symbols may constitute a 0.25 ms slot, and 12 subcarriers, 12×60 kHz=720 kHz, may constitute a PRB. The type C frame structure is four times larger in the subcarrier spacing and the PRB size and four times smaller in the slot length and the symbol length than the type A frame structure.

In light of generalization of the types of frame structure of FIGS. 2 to 4, the 5G system may provide high scalability by determining the subcarrier spacing, CP length, and slot length, which are the set of required parameters, to have integer multiple relationships for each type of frame structure.

Furthermore, a subframe having a fixed length of 1 ms may be defined so as to represent a reference time unit regardless of the type of frame structure. Accordingly, the type A frame structure has a subframe composed of one slot, type B has a subframe composed of two slots, and type C has a subframe composed of four slots.

The aforementioned types of frame structure may be applied to correspond to various scenarios. From the perspective of the cell size, since the longer the CP, the larger cell may be supported, the type A frame structure may support a relatively large cell as compared with types B and C of frame structure. From the perspective of an operating frequency band, since the larger the subcarrier spacing, the better the high frequency band is recovered from phase noise, the type C frame structure may support a relatively high operation frequency as compared with types A and B frame structures. From the perspective of services, it is beneficial to have a shorter slot length, which is the basic time unit of scheduling, to support an ultra-low latency service, so the type C frame structure may be relatively suitable to the URLLC service as compared with types A and B frame structures.

In addition, several types of frame structure may be multiplexed by BWP technology in a single system and operated in an integrated manner.

In an initial access stage for a terminal to access the system for the first time, the terminal may first make synchronization in the downlink time and frequency domain based on a sync signal through cell search and obtain a cell ID. The sync signal may include a primary synchronization signal (PSS) and a secondary synchronization signal (SSS). The terminal may further obtain system information and basic parameter values related to transmission and reception, such as system bandwidth or associated control information by receiving a PBCH from the base station. The sync signal may serve as a reference for cell search. Each frequency band employs subcarrier spacing that fits the channel condition such as phase noise. For the data channel or control channel to support various services as described above, different subcarrier spacing may be applied for each service type. The terminal may then switch the link with the base station into a connected state by performing a random access process, and send data to the base station on a physical uplink shared channel (PUSCH).

Figure 5:
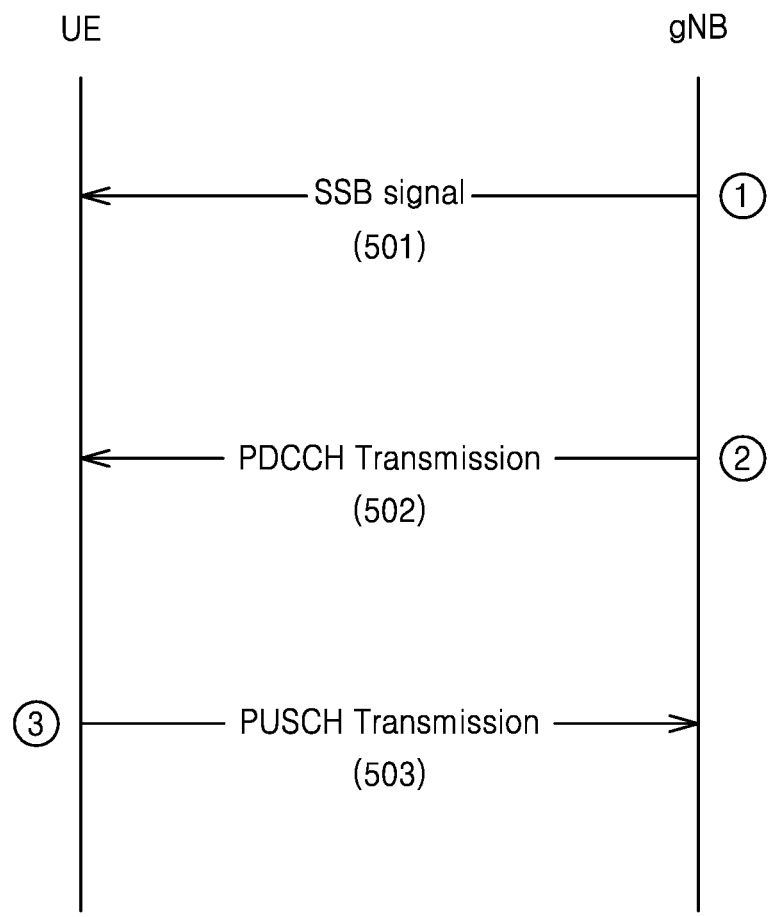
FIG. 5 is a diagram of a process of transmitting an uplink data channel, according to an embodiment.

FIG. 5 is a diagram of a process of transmitting an uplink data channel, according to an embodiment.

The process of transmitting an uplink data channel will now be described in detail in connection with FIG. 5. Referring to FIG. 5, in step 501 of the process of sending uplink data channel, a base station, gNB, may periodically send an SS block including a sync signal and a PBCH (i.e., synchronization signal block (SSB) to multiple terminals, UEs,) in the system. A terminal may then synchronize time/frequency based on the sync signal and may receive required system information required for transmission and reception of the data channel and control channel of the terminal on the PBCH. The terminal may also measure a value of path loss between the base station and the terminal through the SSS in order to determine uplink data transmission power.

In step 502, the base station may send an uplink schedule grant to the terminal on a physical downlink control channel (PDCCH). It may send an uplink resource to be used by the terminal, transmission timing of the uplink data channel, transmission power control (TPC) command, etc., through the uplink scheduling grant including scheduling information. The scheduling information may include control information of an uplink BWP for the terminal.

In step 503, the terminal may use the uplink resource allocated in step 502 to send uplink data to the base station on the PUSCH. Transmission timing on the uplink data channel to send the uplink data may follow the timing control command received from the base station in step 502. Transmission power of the uplink data channel to send the uplink data may be determined by taking into account the value of the path loss measured by the terminal in step 501 and the power control command received from the base station in step 502.

As described above, the transmission power of the uplink data channel to send the uplink data may be determined by the terminal taking into account the value of the path loss measured by the terminal and the power control command from the base station. When the terminal supports BWP, the terminal may prevent unnecessary power consumption of the terminal and minimize uplink interference by optimizing the transmission power of the uplink data channel to send the uplink data when the BWP is changed according to determination of the base station based on the existing uplink BWP channel condition or traffic.

Transmission power of an uplink control channel to send uplink control information may be determined in the similar manner to the following method. Transmission timing of the uplink control channel, TPC command, etc., of the uplink control channel is sent on a downlink control channel of the base station. Based on the aforementioned information, the transmission power for the PUCCH including ACK/NACK information may also be determined in the same manner.

First Embodiment

A method for the terminal to set and send transmission power of the uplink data channel will be described in a case where the terminal sends uplink data on the PUSCH in response to the value of the path loss that the terminal measures from the SS block in the data channel transmission process and a power control command received from the base station. Referring to Equation (1), in slot along with parameter set establishment index j and power control state function index l of the uplink data channel, uplink data channel transmission power $P_{PUSCH}$ may be determined as in the following Equation (1), which is represented in dBm units. In Equation (1), when the terminal supports a plurality of carrier frequencies in a plurality of cells, each parameter may be determined for each cell c and carrier frequency f and distinguished by index c and f.

$$P_{PUSCH,f,c}(i,j,q_d,l) = \min\{P_{CMAX,f,c}(i), \text{Parameter set } A + \alpha_{f,c}(j) \cdot PL_{f,c}(q_d) + f_{f,c}(i,l)\}[\text{dBM}] \quad (1)$$

1) $P_{CMAX,f,c}$: maximum transmission power allowed for the terminal, which is defined by power class and higher layer signaling settings of the terminal.

2) $\alpha_{f,c}(j)$: a value for partially compensating for the path loss, pathloss, between the base station and the terminal, $0 \le \alpha_{f,c}(j) \le 1$.

3) $PL_{f,c}(q_d)$: path loss between the base station and the terminal, the terminal calculating the path loss from a difference between transmission power for a reference signal (RS) resource $q_d$ signaled by the base station and a received signal level of the RS at the terminal. The index $q_d$ determines whether the calculation of the path loss is based on the SS block, the CSI-RS, or both.

4) $f_{f,c}(i,l)$: the $l^{th}$ power control state function calculated in response to a power control command included in the base station scheduling information for the slot i. The number of power control state functions is notified through higher layer signaling. The terminal may calculate $f_{f,c}(i,l)$ for uplink data transmission in the following method.

5) Parameter set A: a value set and signaled by the base station to the terminal to compensate for uplink interference, the value including at least some of the following details:

A. $M_{RB,f,c}^{PUSCH}(i)$: the number of PRBs, which is an amount of frequency resource scheduled by the base station for the slot l;

B. μ: a subcarrier spacing configuration value;

C. $P_{O_{PUSCH,f,c}}(j)$: an amount of interference measured and signaled by the base station to the terminal, where index j is determined depending on the type of date, e.g., j=0 in the case of uplink data transmission of the terminal in a random access process, j=1 for semi-persistent scheduling data having grant-free data or scheduling information that remains unchanged for a certain period of time, and j=2 for dynamically scheduled data; and D. $\Delta_{TF,f,c}(i)$: Equation (1) may be developed into Equation (2) by reflecting details of power offset parameter set A according to a transport format (TF) or modulation and coding scheme (MCS) of data scheduled by the base station for the slot i.

$$P_{PUSCH,f,c}(i, j, q_d, l) = \min \left\{ \begin{array}{l} P_{CMAX,f,c}(i) \\ 10\log_{10}(2^{\mu} \cdot M_{RB,f,c}^{PUSCH}(i)) + P_{0_{PUSCH},f,c}(j) + \alpha_{f,c}(j) \cdot PL_{f,c}(q_d) + \\ \Delta_{TF,f,c}(i) + f_{f,c}(i, l) \end{array} \right\} [dBm].$$ (2)

When the terminal supports BWP, when the BWP of uplink data channel is changed, a method for determining a power control state function $f_{f,c}(i,l)$ to determine uplink data transmission power of the terminal may be defined as follows. The base station may notify the terminal of the changed BWP through higher layer signaling or physical layer signaling.

In a first method for determining a power control state function, regardless of whether an uplink BWP previously used and a BWP for the uplink data channel to send uplink data are changed, a power control state function may be determined in such a method that the terminal accumulates it to the previous power control state function at all the power control commands included in the PDCCH. This is expressed as in Equation (3):

$$f_{f,c}(i,l)=f_{f,c}(i-1,l)+\delta_{PUSCH,f,c}(i-K_{PUSCH},l)$$ (3)

where $f_{f,c}(i-1, l)$: a power control state function value for previous slot i-1;

$K_{PUSCH}$: a slot location where the downlink control channel including the power control command and the uplink scheduling grant is sent. A value of $K_{PUSCH}$ is determined according to transmission timing information of the uplink data channel included in the downlink control channel; and $\delta_{PUSCH,f,c}(i-K_{PUSCH}, l)$ a correction value that is changed by a TPC command included in the downlink control channel received in a slot before $K_{PUSCH}$.

The first method for determining a power control state function is suitable to an occasion when there is a small difference under a channel condition between existing and changed uplink BWPs. In other words, in a case that the conditions between the existing and changed uplink BWPs are similar, even when there is a change in BWP, the power control state function may be determined based on the previously calculated power control state function.

Figure 6:
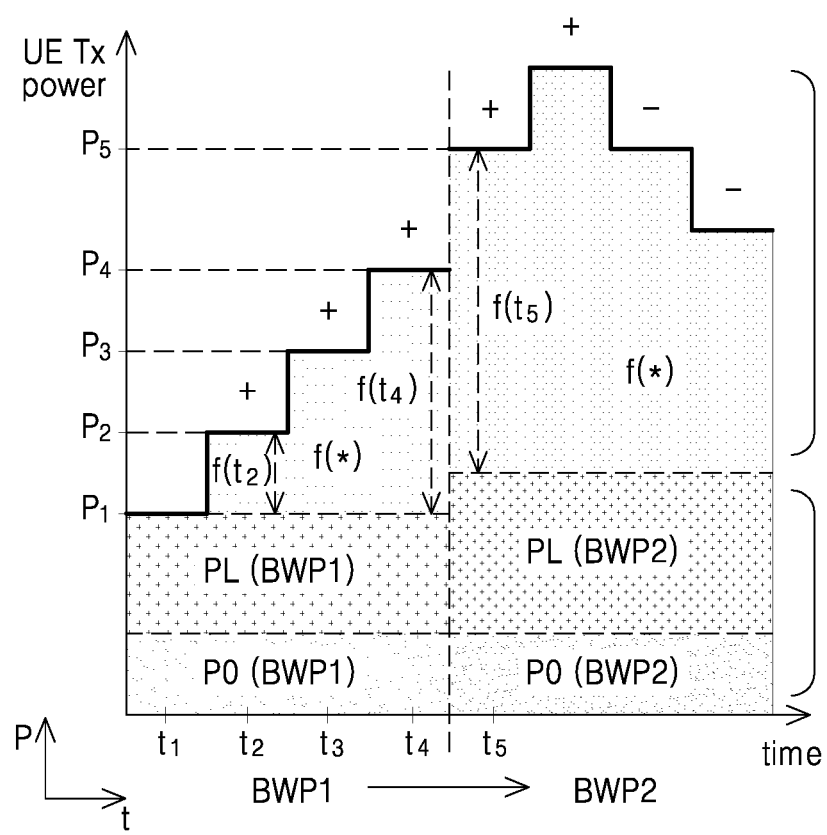
FIG. 6 is a diagram of a process for determining a power control state function, according to an embodiment.

FIG. 6 is a diagram of a process for determining a power control state function, according to an embodiment. Referring to FIG. 6, at t1, transmission may be made from the terminal to the base station at transmission power P1 obtained by adding power control state function $f_{f,c}(t_1)$, where $f_{f,c}(t_1)=0$ in FIG. 6, to a combination of power P0 (BWP1) and power Pb (BWP1) for BWP1. At t2, transmission may be made from the terminal to the base station at power P2 obtained by adding power control state function value $f_{f,c}(t_2)$, which is changed by $\delta_{PDSCH,c}$ from $f_{f,c}(t_1)$, to the unchanged combination of P0 (BWP1) and PL (BWP1). Similarly, at t3 and t4, transmission may be made from the terminal to the base station at power P3 and P4, respectively, obtained by adding accumulated power control state function values $f_{f,c}(t_3)$ and $f_{f,c}(t_4)$, respectively, to the combination of P0 (BW1) and PL (BWP1) until the BWP (BWP1) is changed. When the uplink BWP is changed, at t5, transmission is made at power P5 obtained by adding power control state function $f_{f,c}(t_5)$, which is changed by $\delta_{PDSCH,c}$ from the power control state function value $f_{f,c}(t_4)$ calculated at t4, to a combination of power P0 (PWP2) and power PL (BWP2) for BWP2. In FIG. 6, the BWP that the terminal uses at t5 corresponds to BWP2, which is different from BWP1 that the terminal uses at t4. That is, even when the BWP is changed, the power control state function is calculated by just being accumulated. Even when the BWP used by the terminal is changed again, the transmission power may be determined based on the power control state function value right before the change.

In a second method for determining a power control state function, when the BWP is changed, the terminal initializes calculation of the power control state function, and otherwise the BWP is unchanged, the power control state function may be calculated in the first method for determining a power control state function. When the BWP is changed, the existing power control state function may be initialized. For example, after the previous power control state function $f_{f,c}(i-1)$ is initialized to 0 in Equation (3), the next power control state function may be calculated. The second method for determining a power control state function is suitable to an occasion when there is a large difference under a channel condition between existing and changed uplink BWPs.

Figure 7:
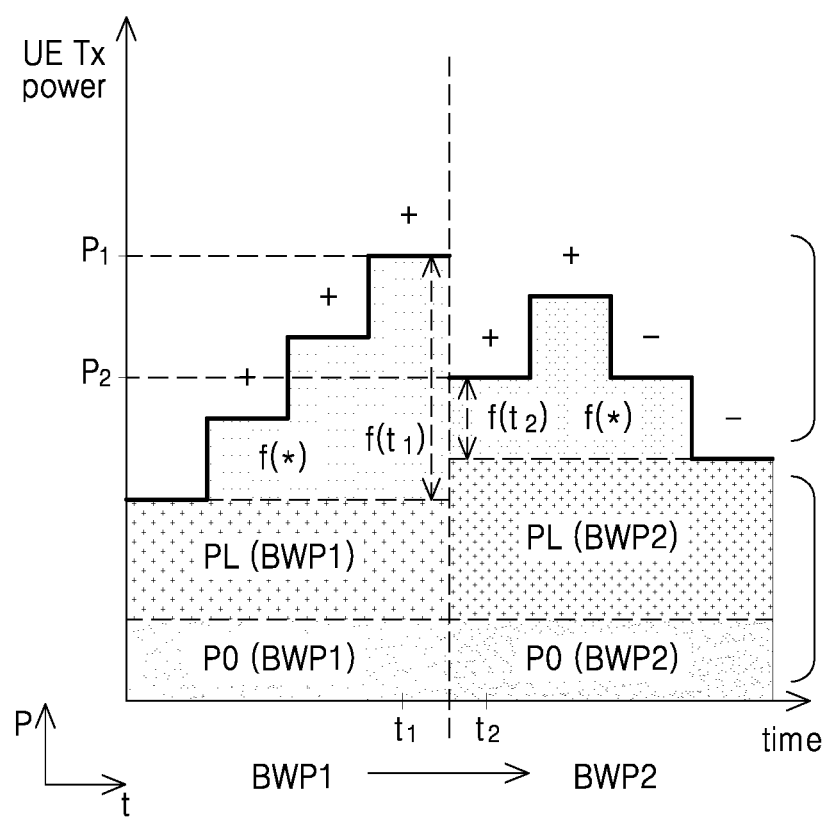
FIG. 7 is a diagram of a process for determining a power control state function, according to an embodiment.

FIG. 7 is a diagram of a process for determining a power control state function, according to an embodiment. Referring to FIG. 7, at t1, transmission may be made from the terminal to the base station at transmission power P1 obtained by adding the power control state function $f_{f,c}(t_1)$ to a combination of power P0 (BWP1) and power PL (BWP1) for BWP1. When the BWP is changed before transmission of the next uplink data, the terminal may initialize $f_{f,c}(t_1)$ to 0 at t2, calculate the next power control state function $f_{f,c}(t_2)$ and make transmission to the base station at P2 obtained by adding the power control state function to a combination of P0 (BWP2) and PL (PWP2) for BWP2. When the BWP used by the terminal is changed again, calculation is made after the power control state function is initialized to 0.

In a third method for determining a power control state function, the base station may determine whether to initialize or just accumulate the previous power control state function and notify the terminal of the determination. This is expressed as in Equation (4):

$$F_{f,c}(i,l)=\gamma \cdot f_{f,c}(i-1,l)+\delta_{PDSCH,f,c}(i-K_{PUSCH},l)$$ (4)

where γ is a weighting factor to control the power control state function to be reflected in the transmission power of uplink data, which may be notified by the base station to the terminal in system information or on a downlink control channel. For example, for γ=1, it is the same as in the first method for determining a power control state function, and for γ=0, it is the same as in the second method for determining a power control state function. The base station may notify a value to be applied to the terminal through signaling.

Figure 8:
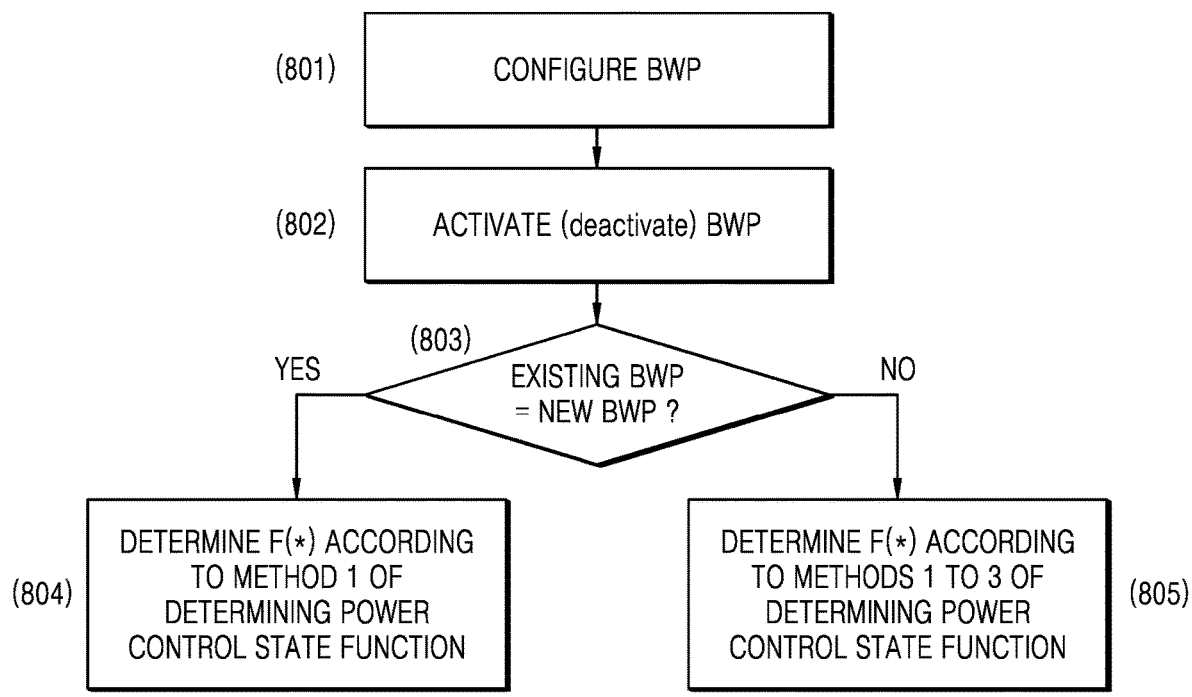
FIG. 8 is a diagram of a procedure of setting parameter values for controlling transmission power of an uplink data channel in a base station, according to an embodiment.

FIG. 8 is a diagram of a procedure of setting parameter values for controlling transmission power of an uplink data channel in a BS, according to an embodiment.

At step 801, the base station establishes a BWP environment to be used by the terminal. The BWP environment may include information about a bandwidth of the BWP, a frequency domain location of the BWP, subcarrier spacing to be applied to the BWP, etc. The established BWP environment may be notified to the terminal through RRC signaling. According to the established BWP environment, parameter values included in Parameter set A of Equation (1) may be set.

At step 802, the base station activates/deactivates particular BWPs to be used by the terminal in the established BWP environment. The activated/deactivated BWP may be notified to the terminal through higher layer signaling or physical layer signaling on the downlink control channel.

At step 803, the base station determines whether the existing BWP is identical to a new BWP.

When the BWP is not changed, a value of $f_{f,c}(i)$ is determined according to the first method for determining a power control state function at step 804. When the BWP is changed, a value of $f_{f,c}(i)$ is determined according to predetermined one of the first, second, or third methods of determining a power control state function at step 805. Parameter values included in Parameter set A set according to the changed BWP and a power control command value corresponding to the value of $f_{f,c}(i)$ may be sent to the terminal.

The methods for determining a power control state function may be applied even in a situation in which the carrier frequency of the uplink data channel is changed. Specifically, when the carrier frequency of the uplink data channel is changed from $f_1$ to $f_2$, a method for determining a power control state function from $f_{f_1,c}(i)$ to $f_{f_2,c}(i)$ may be applied to determine uplink data transmission power of the terminal.

Table 1 represents an example of corrected values $\delta_{PDSCH,c}$ changed according to the power control command included in the base station scheduling information. For example, when the base station intends to increase the uplink data transmission power of the terminal by 3 dB, it may send a power control command of "3" to the terminal in the base station scheduling information.

TABLE 1

| TPC Command Field in DCI format X | Accumulated $\delta_{PDSCH,c}$ [dB] |
|---|---|
| 0 | −1 |
| 1 | 0 |
| 2 | 1 |
| 3 | 3 |

Second Embodiment

A method for the BS to notify the terminal of an RS to be subjected to path loss measurement will be described. An RS includes an SS block, a CSI-RS, etc.

The path loss between the base station and the terminal is an indication to show whether the channel condition is good or bad. The greater the path loss, the worse the channel condition and the less the amount of change over time, To overcome a bad channel condition caused by large path loss, the terminal needs to set relatively high transmission power for a signal for transmission and send the signal at the power. When the terminal supports a plurality of carrier frequencies in a plurality of cells, each parameter may be calculated for each cell c and carrier frequency f. The path loss $PL_{f,c}$ included in Equation (1) may be calculated from an RS received by the terminal from the base station in Equation (5):

$$PL_{f,c} = \text{referenceSignalPower} - \text{RSRP} \quad (5)$$

where 'referenceSignalPower' denotes base station transmission power of an RS notified by the base station to the terminal in the system information (SI), and 'reference signal received power (RSRP)' denotes a received signal strength of the RS received and measured by the terminal.

In the case of a terminal that supports the BWP, when the uplink or downlink BWP is changed, channel conditions of the RS sent in the downlink BWP and the uplink BWP are different, so the difference of the path losses may be large as the uplink and downlink frequency bandwidths are changed. Accordingly, for the terminal to accurately measure the path loss, the RS to be received from the base station needs to be changed. A method for the base station to notify the terminal of a change in RS from which to measure the path loss will be described as follows. The base station may notify the terminal whether there is a change in BWP.

In a first method for notifying a change in RS, the base station may send information to the terminal in two steps to notify an RS from which to calculate a path loss. The base station may designate a cell in a first step and designate a BWP established for the cell and notify the terminal of the BWP in a second step. Based on the two pieces of information, the terminal may receive an RS sent from the base station in a particular BWP of a particular cell and measure RSRP. From the RSRP measured and SI related to the designated BWP additionally received by the terminal, the terminal may detect base station transmission power of the RS and calculate the path loss. The first method for notifying a change in RS is suitable to an environment in which the base station notifies the terminal of all the established BWP formats. In the environment, a change in RS may be notified to the terminal through a little extra signaling. The base station may inform the terminal of all the established BWP formats through higher layer signaling. In other words, with designation of a cell and a BWP in the cell, the terminal may be able to receive an RS in the downlink BWP and associated SI and measure a path loss.

Figure 9:
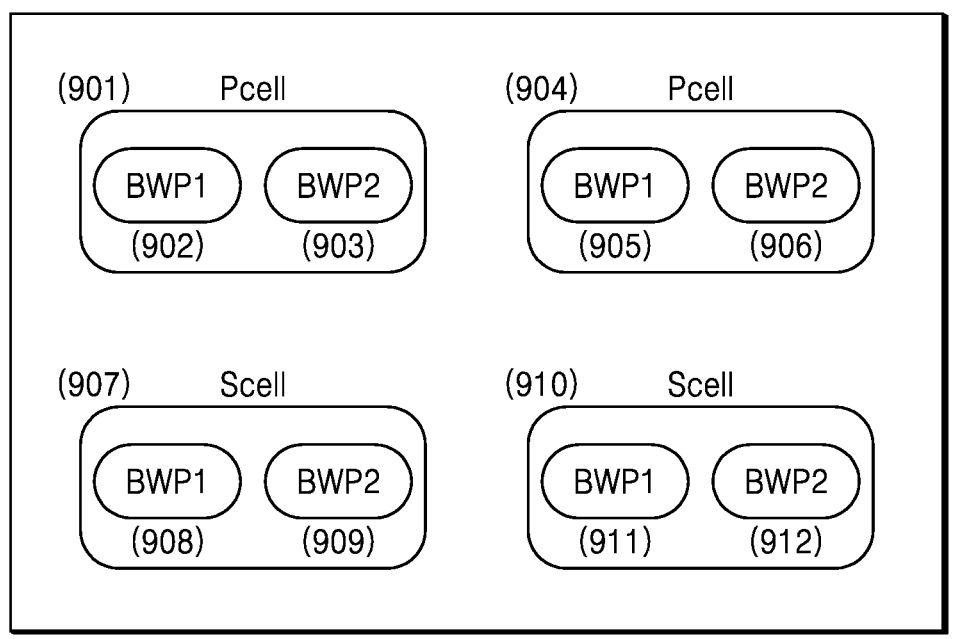
FIG. 9 is a diagram of a bandwidth part (BWP) structure established by a base station, according to an embodiment.

FIG. 9 is a diagram of a bandwidth part (BWP) structure established by a base station, according to an embodiment. In the situation where the downlink BWP is established as shown in FIG. 9, in order for the base station to designate a reference BWP for the terminal to measure an uplink path loss, the base station first designates a cell (one of 901, 904, 907, and 910) and then designates a BWP in the designated cell. For example, the base station may designate BWP1 905 or BWP2 906 once the cell 904 is designated.

In a second method for notifying a change in RS, as in the first method for notifying a change in RS, the base station may designate a cell and a BWP in the cell in two steps for the terminal and may then notify the terminal of them along with RS transmission power 'referenceSignalPower' of the designated BWP. The second method for notifying a change in RS may allow the terminal to receive the BWP-related SI and measure a path loss without an extra process.

In a third method for notifying a change in RS, the base station may designate an RS of a particular frequency bandwidth directly for the terminal and notify the terminal of the change in RS. The terminal may receive the particular RS and measure RSRP. From the RSRP measured and SI signaling related to the designated RS additionally received by the terminal, the terminal may figure out the base station transmission power of the RS and calculate the path loss. The third method for notifying a change in RS is suitable to an environment in which the base station notifies not all the established BWP formats to the terminal. In the environment, the base station may notify a frequency bandwidth of a particular RS for the terminal to receive the RS in the downlink frequency bandwidth and associated SI and measure a path loss.

In a fourth method for notifying a change in RS, as in the third method for notifying a change in RS, the base station may designate an RS of a particular frequency bandwidth directly for the terminal and notify the terminal of the RS along with reference signal transmission power 'referenceSignalPower' of the designated RS. Similar to the second method for notifying a change in RS, the fourth method for notifying a change in RS may allow the terminal to receive the BWP-related SI and measure a path loss without an extra process.

Figure 10:
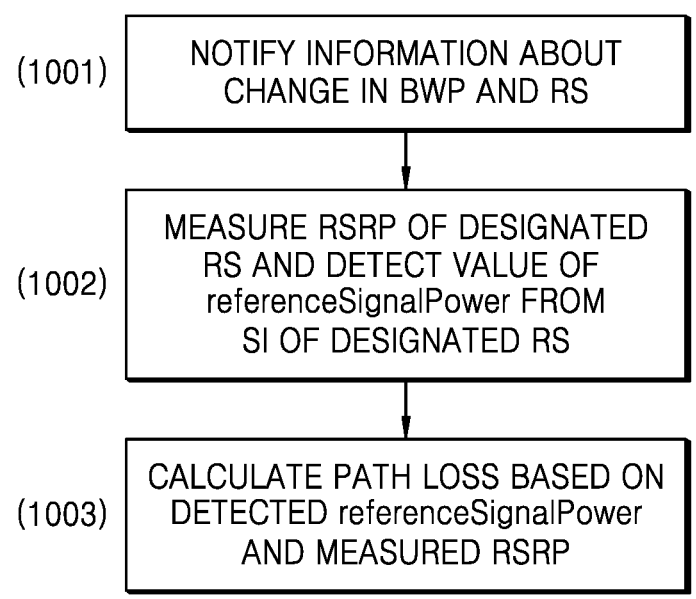
FIG. 10 is a diagram of a process for a terminal to calculate a path loss value in a method for notifying a change of a reference signal, according to an embodiment.

FIG. 10 is a diagram of a process for a terminal to calculate a path loss value in a method for notifying a change in RS, according to an embodiment.

Referring to FIG. 10, a process for a terminal to calculate a path loss with a change in BWP in the first and third methods for notifying a change in RS will be described.

At step 1001, the terminal is notified of information about a change of BWP and associated RS from the base station. The notification may be made to the terminal through higher layer signaling.

At step 1002, the terminal receives a designated RS, measures RSRP, and detects reference signal power, referenceSignalPower, from SI of the designated RS.

At step 1003, the terminal calculates a path loss based on the detected referenceSignalPower and the measured RSRP in Equation (5).

Figure 11:
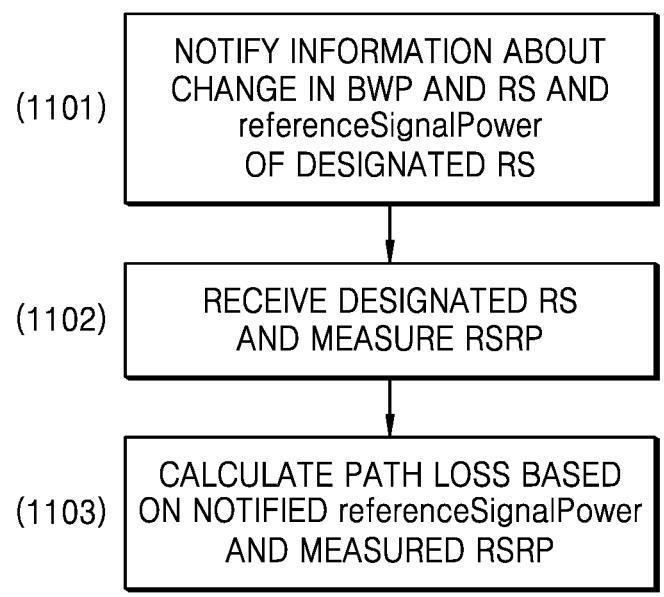
FIG. 11 is a diagram of a process for a terminal to calculate a path loss value in a method for notifying a change of a reference signal, according to an embodiment.

FIG. 11 is a diagram of a process for a terminal to calculate a path loss value in a method of notifying a change in RS, according to another embodiment.

Referring to FIG. 11, a process for a terminal to calculate a path loss with a change in BWP in the second and fourth methods for notifying a change in RS will be described.

At step 1101, the terminal is notified of information about a change in BWP and associated RS, and referenceSignalPower of the changed RS from the base station.

At step 1102, the terminal receives the designated RS and measures RSRP.

Finally, at step 1103, the terminal calculates a path loss based on the notified referenceSignalPower and the measured RSRP in Equation (5).

The most common method for the base station to notify a change in RS through signaling may include designating a downlink BWP, which is the closest to an uplink BWP from which to measure a path loss or an RS.

The methods for notifying a change in RS may be applied even in a situation in which the carrier frequency of the uplink data channel is changed. For example, when the carrier frequency of the uplink or downlink data channel is changed from $f_1$ to $f_2$, the method for the base station to notify a change in RS may be applied to allow the terminal to measure a path loss.

Third Embodiment

A method of compensating for a difference between path loss to be estimated in the downlink and uplink path loss when the terminal sets uplink transmission power will be described.

When the terminal measures path loss of the uplink BWP, there may be a big difference between the actual uplink path loss and measured path loss when the BWP is changed in the uplink, downlink, or both and the difference under a channel condition between the uplink BWP and the downlink RS received by the terminal is large. In this regard, to compensate for the difference, the following methods may be defined:

In a first method of compensating for a difference in path loss, the base station may measure an offset in path loss between the RS of the downlink BWP notified to the terminal and the uplink BWP, and notify the terminal of the offset. The terminal may compensate for the difference in path loss by adding the notified offset and calculate a path loss. This is expressed as in Equation (6):

$$PL_{f,c} = \text{referenceSignalPower} - \text{RSRP} + PL_{off,gNB} \quad (6)$$

where $PL_{off,gNB}$: an offset in path loss between downlink BWP measured and notified by the base station to the terminal and the uplink BWP. The offset in path loss may be sent from the base station to the terminal through extra signaling. The base station may calculate the offset in path loss based on other factors including a difference in frequency.

In a second method of compensating for a difference in path loss, the terminal measures an offset in path loss using a difference in frequency between downlink BWP RS received by the terminal and the uplink BWP and compensates for the offset on its own. This is expressed as in Equation (7):

$$PL_{f,c} = \text{referenceSignalPower} - \text{RSRP} + PL_{off,UE} \quad (7)$$

where $PL_{off,UE}$: an offset in path loss between an RS of downlink BWP received by the terminal and the uplink BWP for transmission. Since the terminal measures and compensates for the offset on its own, measurement is possible without extra signaling from the base station.

In a third method for compensating for a difference in path loss, the base station measures an RSRP value based on an RS received in the uplink BWP (e.g., sounding reference signal (SRS)) and notifies the RSRP to the terminal. The terminal may calculate path loss by comparing the RSRP value notified from the base station to the power value the terminal sends. This is expressed as in Equation (8):

$$PL_{f,c} = \text{referenceSignalPower@UE} - \text{RSRP@gNB} \quad (8)$$

where referenceSignalPower@UE: RS transmission power sent by the terminal to the base station in a slot for which the base station measures the RSRP, and RSRP@gNB: a received signal strength measured by the base station based on the RS sent from the terminal, which may be notified by the base station to the terminal in extra signaling.

The third method for compensating for a difference in path loss is suitable to an environment having little amount of change in path loss over time. In the environment having little amount of change in path loss over time, the base station measures RSRP based on the RS of the uplink BWP and notifies it to the terminal. The terminal may then measure the most accurate path loss based on transmitted and received signal strength of the uplink BWP.

The first, second and third methods for compensating for a difference in path loss may be applied even for a case that the base station measures the path loss. In addition, the methods for compensating for a difference in path loss may be applied even in a situation in which the carrier frequency of the uplink data channel is changed.

Figure 12:
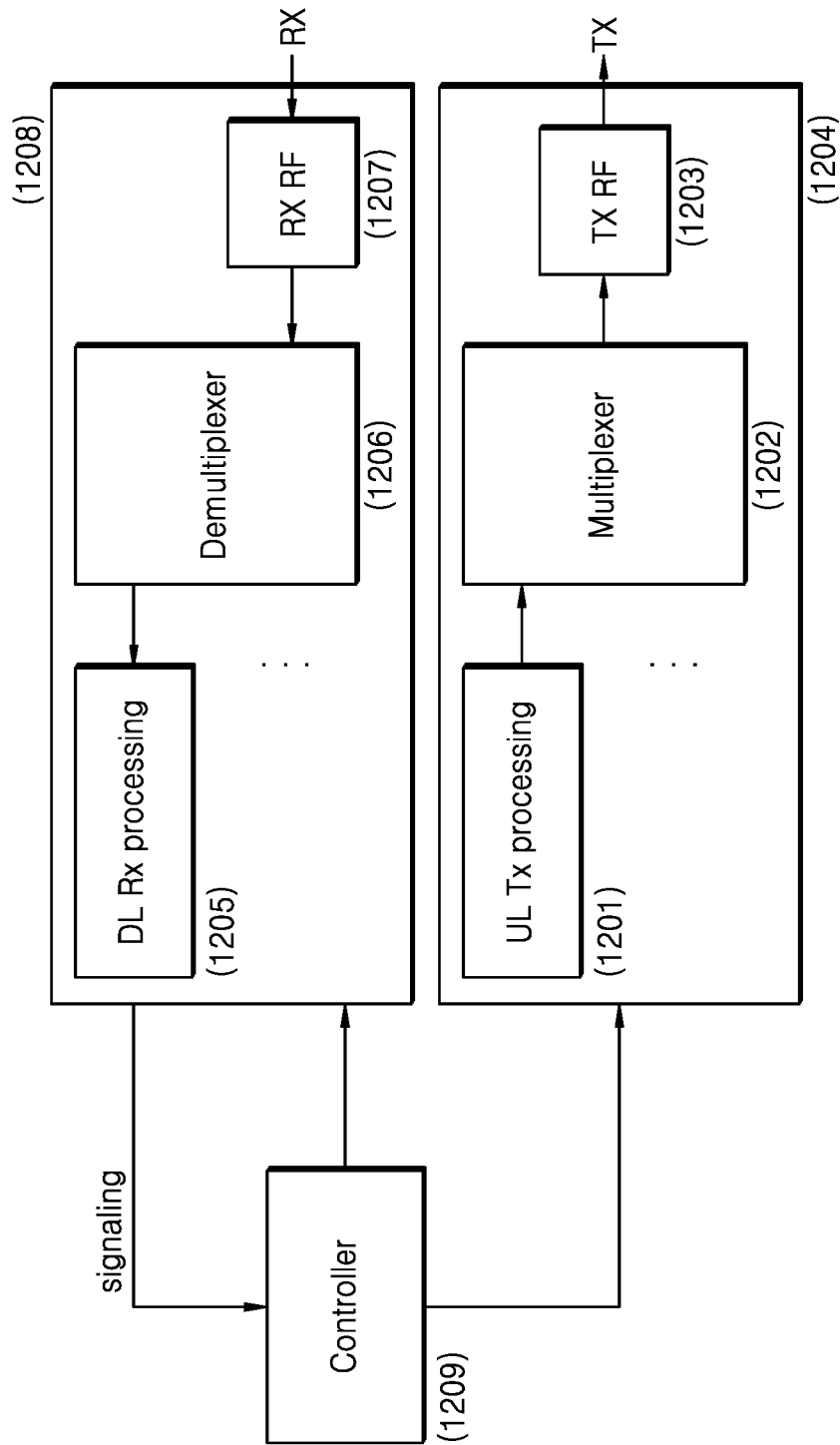
FIG. 12 is a diagram of a terminal, according to an embodiment.

FIG. 12 is a diagram of a terminal, according to an embodiment.

Referring to FIG. 12, a terminal may include a transmitter 1204 including an uplink transmission processing block 1201, a multiplexer 1202, a transmission RF block 1203, a receiver 1208 including a downlink reception processing block 1205, demultiplexer 1206, and a reception RF block 1207, and a controller 1209.

The controller 1209 may control the respective element blocks of the receiver 1208 for receiving a data channel or control channel sent by the base station and the respective element blocks of the transmitter 1204 for transmitting uplink signals by determining whether the terminal receives BWP and RS change information, whether the terminal receives referenceSignalPower information, etc., as described above.

The uplink transmission processing block 1201 of the transmitter 1204 of the terminal may generate a signal for transmission by performing a process, such as channel coding, modulation, etc. The signal generated in the uplink transmission processing block 1201 may be multiplexed with another uplink signal by the multiplexer 1202, subjected to signal processing in the transmission RF block 1203, and then sent to the base station.

The receiver 1208 of the terminal may de-multiplex the signal received from the base station and distribute the results of de-multiplexing to the respective downlink reception processing blocks. The downlink reception processing block 1205 may obtain control information or data sent by the base station by performing a process such as demodulation, channel decoding, and/or the like on the downlink signal from the base station. The receiver 1208 of the terminal may provide the output result of the downlink reception processing block 1205 to the controller 1209 to support operation of the controller 1209.

Figure 13:
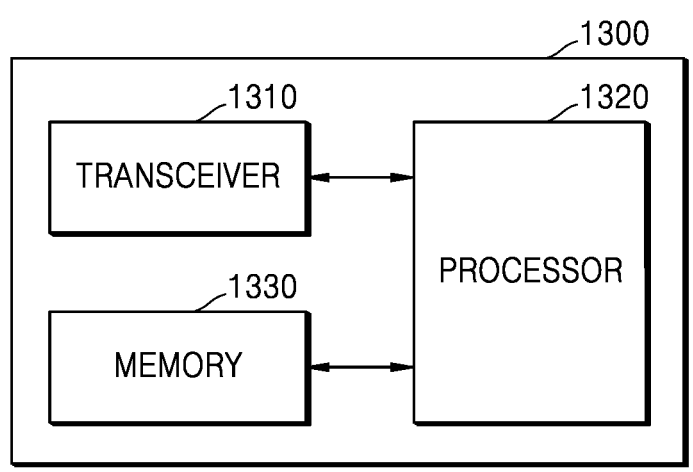
FIG. 13 is a diagram of a base station, according to an embodiment.

FIG. 13 is a diagram of a base station 1300, according to an embodiment.

Referring to FIG. 13, the base station 1300 may include a transceiver 1310, a processor 1320, and a memory 1330. According to operation of the base station as described above in connection with FIGS. 5 to 11, the transceiver 1310, the processor 1320, and the memory 1330 may operate. The elements of the base station 1300 are not, however, limited thereto. For example, the base station 1300 may include more or fewer elements than described above. In addition, in a special occasion, the transceiver 1310, the processor 1320, and the memory 1330 may be implemented in a single chip.

The transceiver 1310 may transmit or receive signals to or from a terminal.

The signals may include control information and data. For this, the transceiver 1310 may include an RF transmitter for up-converting the frequency of a signal to be transmitted and amplifying the signal and an RF receiver for low-noise amplifying a received signal and down-converting the frequency of the received signal. This is only an example, and the elements of the transceiver 1310 are not limited to the RF transmitter and the RF receiver.

In addition, the transceiver 1310 may receive a signal on a wireless channel and output the signal to the processor 1320, or transmit a signal output from the processor 1320 on a wireless channel.

The processor 1320 may control a series of processes for the base station 1300 to operate. For example, the processor 1320 may execute at least one method of controlling uplink transmission power.

The memory 1330 may store control information or data included in a signal obtained in the base station 1300 and have sectors for storing data required to control the processor 1320 and data that occurs in the control operation of the processor 1320. The memory 1330 may be implemented in various forms, such as read only memory (ROM) and/or random access memory (RAM) and/or a hard disk and/or a compact disc (CD)-ROM and/or a digital versatile disk (DVD), and/or the like.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

The method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:

receiving a first reference signal (RS) on a first downlink bandwidth part (BWP) of a first carrier of a serving cell;

determining first pathloss information for a transmission of a physical uplink control channel (PUCCH) based on the first RS received on the first downlink BWP of the first carrier of the serving cell;

determining a transmission power for the PUCCH based on the first pathloss information;

receiving a second RS on a second downlink BWP of a second carrier of the serving cell;

determining second pathloss information for a transmission of a physical uplink shared channel (PUSCH) based on the second RS received on the second downlink BWP of the second carrier of the serving cell; and determining a transmission power for the PUSCH based on the second pathloss information.

2. The method of claim 1, further comprising:

receiving information indicating switching from a first uplink BWP to a second uplink BWP; and determining a power control adjustment state function for the second uplink BWP by using a power control adjustment state function for the first uplink BWP.

3. The method of claim 1, further comprising:

receiving cell information indicating the serving cell via radio resource control (RRC) signaling for the PUCCH; and receiving the first RS on the first downlink BWP of the first carrier of the serving cell based on the cell information indicating the serving cell.

4. The method of claim 1, wherein the transmission power for the PUSCH is determined as:

$$P_{PUSCH,f,c}(i, j, q_d, l) = \min \begin{Bmatrix} P_{CMAX,f,c}(i) \\ 10\log_{10}(2^\mu \cdot M_{RB,f,c}^{PUSCH}(i)) + P_{O_{PUSCH},f,c}(j) + \alpha_{f,c}(j) \cdot PL_{f,c}(q_d) + \\ \Delta_{TF,f,c}(i) + f_{f,c}(i, l) \end{Bmatrix} [dBm].$$

5. The method of claim 1, wherein the transmission power for the PUCCH is determined as:

$$P_{PUCCH,b,f,c}(i, q_u, q_d, l) = \min \begin{Bmatrix} P_{CMAX,f,c}(i), \\ P_{O_{PUCCH},b,f,c}(q_u) + \\ 10\log_{10}(2^\mu \cdot M_{RB,b,f,c}^{PUCCH}(i)) + PL_{b,f,c}(q_d) + \Delta_{F_{PUCCH}}(F) + \Delta_{TFb,f,c}(i) + g_{b,f,c}(i, l) \end{Bmatrix} [dBm].$$

6. A method performed by a base station in a wireless communication system, the method comprising:
transmitting a first reference signal (RS) on a first downlink bandwidth part (BWP) of a first carrier of a serving cell;
transmitting a second RS on a second downlink BWP of a second carrier of the serving cell;
receiving, from a terminal, a physical uplink control channel (PUCCH) based on a PUCCH transmission power determined using the first RS; and
receiving, from the terminal, a physical uplink shared channel (PUSCH) based on a PUSCH transmission power determined using the second RS,
wherein the PUCCH transmission power is determined based on first pathloss information for the PUCCH and the first pathloss information for the PUCCH is determined based on the first RS, and
wherein the PUSCH transmission power is determined based on second pathloss information for the PUCCH and the second pathloss information for the PUCCH is determined based on the second RS.

7. The method of claim 6, further comprising transmitting, to the terminal, information indicating switching from a first uplink BWP to a second uplink BWP,
wherein a power control adjustment state function for the second uplink BWP is determined by using a power control adjustment state function for the first uplink BWP.

8. The method of claim 6, further comprising:
transmitting, to the terminal, cell information indicating the serving cell via radio resource control (RRC) signaling for the PUCCH; and
transmitting the first RS on the first downlink BWP of the first carrier of the serving cell based on the cell information indicating the serving cell.

9. The method of claim 6, wherein the PUSCH transmission power is determined as:

$$P_{PUSCH,f,c}(i, j, q_d, l) = \min \begin{Bmatrix} P_{CMAX,f,c}(i) \\ 10\log_{10}(2^\mu \cdot M_{RB,f,c}^{PUSCH}(i)) + P_{O_{PUSCH},f,c}(j) + \alpha_{f,c}(j) \cdot PL_{f,c}(q_d) + \\ \Delta_{TF,f,c}(i) + f_{f,c}(i, l) \end{Bmatrix} [dBm].$$

10. The method of claim 6, wherein the PUCCH transmission power is determined as:

$$P_{PUCCH,b,f,c}(i, q_u, q_d, l) = \min \begin{Bmatrix} P_{CMAX,f,c}(i), \\ P_{O_{PUCCH},b,f,c}(q_u) + \\ 10\log_{10}(2^\mu \cdot M_{RB,b,f,c}^{PUCCH}(i)) + PL_{b,f,c}(q_d) + \Delta_{F_{PUCCH}}(F) + \Delta_{TFb,f,c}(i) + g_{b,f,c}(i, l) \end{Bmatrix} [dBm].$$

11. A terminal in a wireless communication system, the terminal comprising:
a transceiver; and
at least one processor coupled with the transceiver and configured to:
receive a first reference signal (RS) on a first downlink bandwidth part (BWP) of a first carrier of a serving cell,
determine first pathloss information for a transmission of a physical uplink control channel (PUCCH) based on the first RS received on the first downlink BWP of the first carrier of the serving cell,
determine a transmission power for the PUCCH based on the first pathloss information,
receive a second RS on a second downlink BWP of a second carrier of the serving cell,
determine second pathloss information for a transmission of a physical uplink shared channel (PUSCH) based on the second RS received on the second downlink BWP of the second carrier of the serving cell, and
determine a transmission power for the PUSCH based on the second pathloss information.

12. The terminal of claim 11, wherein the at least one processor is further configured to:
receive information indicating switching of from a first uplink BWP to a second uplink BWP, and
determine a power control adjustment state function for the second uplink BWP by using a power control adjustment state function for the first uplink BWP.

13. The terminal of claim 11, wherein the at least one processor is further configured to:
receive cell information indicating the serving cell via radio resource control (RRC) signaling for the PUCCH, and
receive the first RS on the first downlink BWP of the first carrier of the serving cell based on the cell information indicating the serving cell.

14. The terminal of claim 11, wherein the transmission power for the PUSCH is determined as:

$$P_{PUSCH,f,c}(i, j, q_d, l) = \min\left\{\begin{array}{l}P_{CMAX,f,c}(i)\\10\log_{10}(2^\mu \cdot M_{RB,f,c}^{PUSCH}(i)) + P_{O_{PUSCH},f,c}(j) + \alpha_{f,c}(j) \cdot PL_{f,c}(q_d) + \\ \Delta_{TF,f,c}(i) + f_{f,c}(i, l)\end{array}\right\} [dBm].$$

15. The terminal of claim 11, wherein the transmission power for the PUCCH is determined as:

16. A base station in a wireless communication system, the base station comprising:
a transceiver; and
at least one processor coupled with the transceiver and configured to:
transmit a first reference signal (RS) on a first downlink bandwidth part (BWP) of a first carrier of a serving cell,
transmit a second RS on a second downlink BWP of a second carrier of the serving cell,
receive, from a terminal, a physical uplink control channel (PUCCH) based on a PUCCH transmission power determined using the first RS, and
receive, from the terminal, a physical uplink shared channel (PUSCH) based on a PUSCH transmission power determined using the second RS,
wherein the PUCCH transmission power is determined based on first pathloss information for the PUCCH and the first pathloss information for the PUCCH is determined based on the first RS, and
wherein the PUSCH transmission power is determined based on second pathloss information for the PUCCH and the second pathloss information for the PUCCH is determined based on the second RS.

17. The base station of claim 16, wherein the at least one processor is further configured to transmit, to the terminal, information indicating switching from a first uplink BWP to a second uplink BWP, and
wherein a power control adjustment state function for the second uplink BWP is determined by using a power control adjustment state function for the first uplink BWP.

18. The base station of claim 16, wherein the at least one processor is further configured to:
transmit, to the terminal, cell information indicating the serving cell via radio resource control (RRC) signaling for the PUCCH, and
transmit the first RS on the first downlink BWP of the first carrier of the serving cell based on the cell information indicating the serving cell.

19. The base station of claim 16, wherein the PUSCH transmission power is determined as:

$$P_{PUCCH,b,f,c}(i, q_u, q_d, l) = \min\left\{\begin{array}{l}P_{CMAX,f,c}(i),\\P_{O_{PUCCH},b,f,c}(q_u) + \\10\log_{10}(2^\mu \cdot M_{RB,b,f,c}^{PUCCH}(i)) + PL_{b,f,c}(q_d) + \Delta_{F_{PUCCH}}(F) + \Delta_{TFb,f,c}(i) + g_{b,f,c}(i, l)\end{array}\right\} [dBm].$$

$$P_{PUSCH,f,c}(i, j, q_d, l) = \min\left\{\begin{array}{c} P_{CMAX,f,c}(i) \\ 10\log_{10}\left(2^\mu \cdot M_{RB,f,c}^{PUSCH}(i)\right) + P_{0_{PUSCH},f,c}(j) + \alpha_{f,c}(j) \cdot PL_{f,c}(q_d) + \\ \Delta_{TF,f,c}(i) + f_{f,c}(i, l) \end{array}\right\} [dBm].$$

20. The base station of claim 16, wherein the PUCCH transmission power is determined as:

$$P_{PUCCH,b,f,c}(i, q_u, q_d, l) = \min\left\{\begin{array}{c} P_{CMAX,f,c}(i), \\ P_{0_{PUCCH},b,f,c}(q_u) + \\ 10\log_{10}\left(2^\mu \cdot M_{RB,b,f,c}^{PUCCH}(i)\right) + PL_{b,f,c}(q_d) + \Delta_{F_{PUCCH}}(F) + \Delta_{TFb,f,c}(i) + g_{b,f,c}(i, l) \end{array}\right\} [dBm].$$

\* \* \* \* \*